United States Patent
Hald et al.

(10) Patent No.: US 9,912,441 B2
(45) Date of Patent: Mar. 6, 2018

(54) CONSUMPTION METER WITH ERROR-CORRECTION

(71) Applicant: Kamstrup A/S, Skanderborg (DK)

(72) Inventors: Flemming Hald, Hadsten (DK); Rene Rørbye Pedersen, Låsby (DK); Johnny Dørken Christiansen, Galten (DK); Rasmus Melchior Jacobsen, Aalborg (DK)

(73) Assignee: KAMSTRUP A/S, Skanderborg (DK)

( * ) Notice: Subject to any disclaimer, the term of this patent is extended or adjusted under 35 U.S.C. 154(b) by 0 days.

(21) Appl. No.: 15/037,519

(22) PCT Filed: Nov. 21, 2014

(86) PCT No.: PCT/DK2014/050396
§ 371 (c)(1),
(2) Date: May 18, 2016

(87) PCT Pub. No.: WO2015/074666
PCT Pub. Date: May 28, 2015

(65) Prior Publication Data
US 2016/0285588 A1    Sep. 29, 2016

(30) Foreign Application Priority Data
Nov. 22, 2013 (EP) .................................. 13194063

(51) Int. Cl.
*H04L 1/00* (2006.01)
*H04Q 9/00* (2006.01)
(Continued)

(52) U.S. Cl.
CPC .......... *H04L 1/0041* (2013.01); *G06Q 50/06* (2013.01); *G08C 17/02* (2013.01); *H04L 1/0002* (2013.01);
(Continued)

(58) Field of Classification Search
CPC ...................................................... H04L 1/0057
(Continued)

(56) References Cited

U.S. PATENT DOCUMENTS 7,626,511 B2    12/2009  Lazar
8,170,494 B2 *   5/2012  Husted ..................... H03C 5/00
                                                            455/73

(Continued)

FOREIGN PATENT DOCUMENTS

GB        2463252 A       3/2010
WO     2007030812 A2      3/2007

OTHER PUBLICATIONS

International Search Report for corresponding patent application No. PCT/DK2014/050396 dated Mar. 3, 2015.

*Primary Examiner* — Fritz Alphonse
(74) *Attorney, Agent, or Firm* — Renner, Otto, Boisselle, & Sklar, LLP.

(57) ABSTRACT

The present invention relates to a device and a system for transmitting data messages which can be received by different types of receivers. A device and system are disclosed where data transmissions are based on data messages (2) comprising two parts, a first part (20) being encoded in accordance with a communication protocol, such as the wireless MBus protocol, and a second part (21) which comprises error-correcting information for enabling a receiver device to correct errors in the data message (2), such as parity information related to turbo coding. The first part (20) forms an independent sub data message which can be received independently of the content of the second part (21). The sub data message can be received as is within a first communication range (6), and the entire data message can by virtue of the error correction information, and subsequent error correction, be received within a second longer communication range (7).

17 Claims, 3 Drawing Sheets

(51) Int. Cl.
*G06Q 50/06* (2012.01)
*G08C 17/02* (2006.01)
(52) U.S. Cl.
CPC .......... *H04L 1/0033* (2013.01); *H04L 1/0045* (2013.01); *H04L 1/0057* (2013.01); *H04L 1/0084* (2013.01); *H04Q 9/00* (2013.01); *H04Q 2209/50* (2013.01); *H04Q 2209/60* (2013.01)
(58) Field of Classification Search
USPC ................................ 714/776, 774, 775, 788
See application file for complete search history.

(56) References Cited

U.S. PATENT DOCUMENTS

| | | | |
|---|---|---|---|
| 2008/0192622 A1* | 8/2008 | Scheim | H04L 1/0025 370/210 |
| 2008/0231498 A1* | 9/2008 | Menzer | G01S 7/28 342/134 |
| 2016/0283492 A1* | 9/2016 | Duminy | G06F 17/30569 |

* cited by examiner

CONSUMPTION METER WITH ERROR-CORRECTION

This application is a national phase of International Application No. PCT/DK2014/050396 filed Nov. 21, 2014 and published in the English language.

FIELD OF THE INVENTION

The present invention relates to a device and a system for transmitting data messages related to consumption data of a supplied utility. In particular, the invention relates to a device and a system for transmission of consumption data which can be received at different ranges depending on the receiver device.

BACKGROUND OF THE INVENTION

Consumption meters for measuring consumption data of a supplied utility, for example electricity meters, heat meters for district heating, and water meters for cold or hot water, are often equipped with a communication unit for remote communication with the meter. Remote communication greatly facilitates data collection and different collection schemes for collecting the data exist.

In one type of collection scheme, a mobile collector system is used. In such a system short range data messages are transmitted from the meter, or from a communication device attached to the meter, to a collector unit moved by the transmitter device to collect the transmitted data, normally either by passing by with a vehicle or simply walking by (drive-by/walk-by collection). In such a system meter data can be collected without a need to enter the property of the customers, a person or a vehicle only needs to pass by within the communication range of the transmitted signal. Mobile collector systems may be kept simple and inexpensive.

In another type of collection scheme, fixed collectors are used. In such a system a communication network is constructed so that data are transmitted from the meter to the utility or other data collector station in a fully automated manner. The advantage of such a system is that data can be collected automatically and thereby with short fixed intervals if desired. However, the installation and maintenance of such a system renders it more expensive than a mobile collector system, and often a rather large number of meter sites is needed within an area in order to justify the cost.

In some cases mobile and fixed collector systems are combined in a so-called dual transmission system. In a dual transmission system, different data messages are sent by the transmitter to be collected by (at least) two different types of receiver devices. Dual transmission systems may e.g. be desired in order to provide a backup route of data to the data collector station.

A number of dual transmission systems is disclosed with the prior art. In U.S. Pat. No. 7,626,511 a dual transmission system is disclosed where a meter is arranged for transmitting a plurality of narrow band signals at a limited power level and a plurality of frequency-hopping, spread-spectrum signals at a high power level. The narrow band signals are transmitted at intervals which are shorter than the spread-spectrum signals. In this solution, distinct signals are used for different receiver devices.

SUMMARY OF THE INVENTION

It would be advantageous to achieve a transmission system which in a simple and flexible manner supports mobile collection schemes as well as fixed collection schemes of consumption meter data. In general it would be advantageous to achieve a transmission system which in a simple manner support a collection scheme which mix transmissions that can be collected at different ranges to provide a flexible collection system. In general, it may be seen as an object of the present invention to provide a solution to the above mentioned problems, or other problems, of the prior art.

To achieve such a solution, there is provided, in a first aspect of the invention a device for transmitting data messages relating to consumption data of a supplied utility, the device being arranged as a communication unit of a consumption meter, wherein the device is arranged for encoding and transmitting a data message which comprises two parts:
a first part which comprises a payload and being encoded in accordance with a communication protocol, and
a second part which comprises error-correcting information for enabling a receiver device to correct errors in the data message,
characterised in that
the data message is encoded so that the first part forms an independent sub data message which can be received independently of the second part by a receiver device, the sub data message being arranged for being received by a receiver within a first communication range, and wherein the data message comprising the first and the second part is arranged for being received by a receiver within a second communication range, the second communication range being longer than the first communication range.

A device is thus provided which supports that a single data message can be generated and transmitted by the consumption meter, or by a communication device connected to the consumption meter, and received at different distances from the meter, by different receiver device types, depending on whether the receiver is arranged for receiving the sub data message or the entire data message. In this manner a first type of collector device (e.g. a mobile collector device) can be used for collecting meter data by collecting the sub data message, whereas a second type of collector device (e.g. a fixed collector device of a collection network) can be used for collecting meter data by collecting the entire data message. Alternatively, a short range receiver can be used for collecting the sub data message, whereas a long range receiver can be used for collecting the entire data message. The payload is naturally an important part to collect in terms of obtaining the consumption data. The sub data message can be collected within a communication range where the payload can be received in an error-free manner. By including error correcting information in the data message, the communication range can be increased, at the expense of collecting a longer data message, and either retransmitting a longer message or correcting the received data. Thus the sub data message can be received as is within a first communication range, whereas and the entire data message can by virtue of the error correction information, and sub-sequent error correction, be received within a second longer communication range.

The device thus provides a single transmitter circuit which may operate with a single transmission mode, and yet transmitting data messages which supports dual collection of the consumption data.

In an advantageous embodiment the error correcting information is information relating to error correction by use of turbo coding. The error correcting information may thus be parity information, which is generated by a turbo encoder, and which may be used in a turbo decoder on the receiver to reconstruct the data message. Other important error correcting information is low-density-parity-check (LDPC) codes. Turbo codes belong to a class of high-performance forward error correction (FEC) codes which enable reliable communication near the theoretical limit. LDPC codes may provide similar performance.

In an advantageous embodiment the device is further arranged for transmission of a further data message, the further data message being the sub data message. The sub data message is shorter than the entire data message and requires less computing power to generate and to receive. The entire data message may be transmitted less frequently while transmitting the sub data message, and thereby the payload, more frequently. In this manner, a long-range data message can be provided concurrently with a frequently transmitted short-range message, e.g. to ensure flexible mobile collection and a low power consumption of the transmitter.

In a further aspect, the invention relates to a system for communication of data messages relating to consumption data of a supplied utility, the system comprises a device for transmitting data message according to the first aspect, and a first data receiver device and at least a second data receiver device, wherein the first data receiver is arranged for receiving the sub data message, and wherein the second data receiver is arranged for receiving the data message.

In a general embodiment, the first data receiver may be a short range receiver used for collecting the sub data message, and the second data receiver may be a long range receiver used for collecting the entire data message.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 schematically illustrates an embodiment of a wireless AMR/AMI network.

DESCRIPTION OF EMBODIMENTS

In general, a data network for remote reading of consumption meters can be build in a number of ways based on various network structures. For an automatic meter reading (AMR) network or advanced metering infrastructure (AMI) network, the network should be robust, but also relatively cost-efficient to deploy and maintain. AMR/AMI networks are often challenged by great variations in the collection area in terms of density of meters, placement of meters, general radio communication conditions, i.e. due to buildings, trees, vehicles, etc. Embodiments of the present invention provide a wireless radio frequency-based AMR/AMI network which supports a flexible collection scheme.

Figure 1:
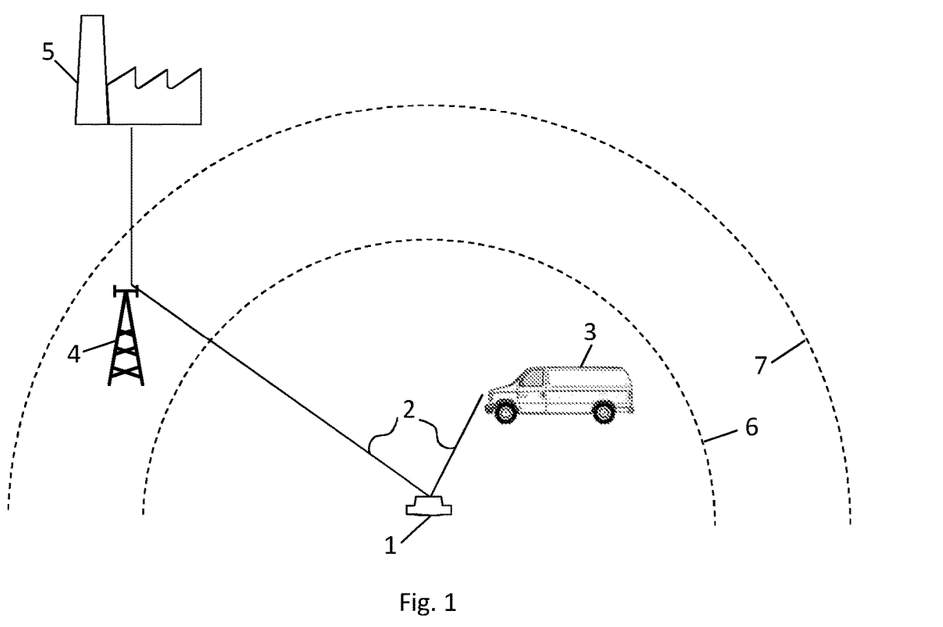

FIG. 1 schematically illustrates an embodiment of a wireless AMR/AMI network in accordance with the present invention. The figure shows a meter 1, e.g. a water meter or a heat meter, which measures a consumed amount of the supplied utility, e.g. the amount of consumed water or heat of a given household, and which reports the meter data to the utility owner for billing purposes. In order to collect the consumption data from the individual meters, the meters are arranged to transmit data messages 2 which contains the meter data so that the utility remotely can collect the consumption data. To this end, the consumption meter is equipped with, or communicatively connected to, communication circuits or units capable of transmitting the collected consumption data in the data network.

In the illustrated embodiment, the data message 2 is either collected by a mobile collector 3 or a fixed collector 4, or both. The mobile collector may be a handheld device such as a specially programmed smart phone or other electronic device. The mobile collector is illustrated by a car 3. Typically, the mobile collector is carried by an operator, either by driving by the meter, or walking by the meter (or a combination while moving along a collection route). The mobile collector may also be mounted on a service vehicle, such as a garbage truck. The fixed collector 4 may be a concentrator device or a repeater device for transmitting meter data to the utility 5 in an automatic manner. The fixed collector is illustrated to be mounted in an antenna pylon, but it may be mounted at other locations, typically it is however mounted at a high point. The fixed collector is illustrated to be in direct contact with the utility 5, e.g. by use of GPRS, wireless internet, cabled internet, etc. In general, a more complex communication topology may be used for transmitting data from the collector to the utility, such as a topology based on a multihop fixed network or multihop mesh network.

The consumption meter 1 may at the installation site be placed in a number of ways. In one example, the meter is installed above ground, e.g. in a shed or in a room of a house. In another example, the meter is installed below ground in a pit. If installed in a pit, the communication unit of the meter may be, or may partly be, installed in a pit lid.

In FIG. 1, a mobile collector 3 and a fixed collector 4 are illustrated. In embodiments, also two fixed collectors may be used. A first fixed collector may be a short range fixed collector and a second fixed collector may be a long range fixed collector. Such a system may be used for ensuring a back up reading should the short range system exhibit an outage. In other embodiments, two mobile collectors may be used. For example, a long range collector is mounted on a service vehicle to collect data at fixed periods. However, in other periods, e.g. holidays, irregularities in the service of the service vehicle, or for other reasons, the mobile collector may be used for ensuring a back up collection means. In further embodiments more than two collector types may be used if desired.

The collection system may support both unidirectional and bidirectional communication. Dual transmission systems are mainly used in connection with unidirectional communication systems. With appropriate receivers in the consumption meter, embodiments of the present invention may be implemented to support bidirectional communication.

Figure 2:
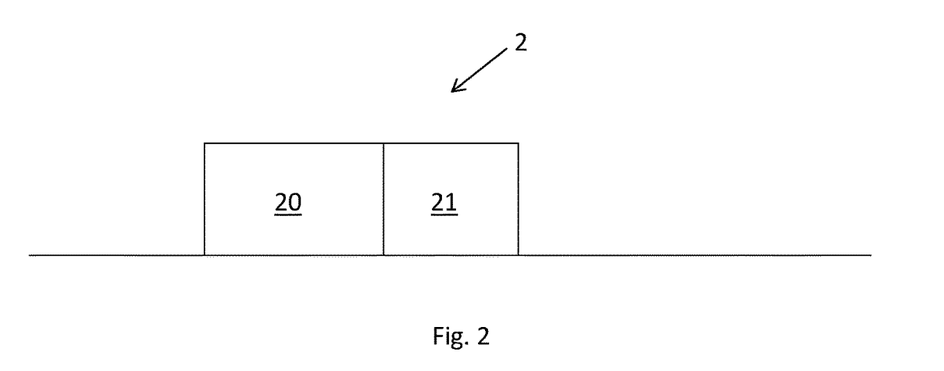
FIG. 2 schematically illustrates a general data message comprising two parts, a first part comprising a payload and a second part comprising error-correcting information.

FIG. 2 schematically illustrates a general data message in accordance with embodiments of the present invention. The data message 2 comprises two parts 20, 21. The first part 20 comprises a payload and the second part 21 comprises error-correcting information for enabling a receiver device to correct errors in the data message, either in the first part of the message or in the entire message depending on the specific setup. In general, the second part 21 comprises error-correcting information for enabling a receiver device to correct errors in at least the payload of the first part of the data message.

The data message is encoded in such a manner that the first part 20 forms an independent sub data message which can be received independently of the content of the second part by a receiver device. The first part is encoded in accordance with a given communication protocol, so that any receiver device which is properly constructed to receive data messages in accordance with this radio protocol is capable of receiving the sub data message 20 for further data treatment, e.g. to extract the payload.

The communication protocol may for example be the MBus protocol (EN13757) or other appropriate protocols for transmission of meter data. The communication protocol normally defines the frequency range, communication channel, signal strength, etc. The data messages may be transmitted as radio signals, e.g. in the frequency range between 850 MHz and 950 MHz, such as in the range of 868 to 870 MHz or in the range of 900 MHz to 915 MHz. In general, however, any suitable signal frequency may be used.

Depending on the specific choice of signal parameters of the data message, the sub data message may be received with an acceptable reception success rate within a first communication range 6. This first communication range depends on many factors and is different for obstruction free line of sight communication and residential area communications with many obstructions.

The data message 2 further comprises a second part 21, which together with the first part 20 forms an extended data message. The second part comprises error correcting information, which enables a receiver to receive the data message within a second communication range 7. Due to the ability to correct transmission errors, the second communication range is longer than the first communication range.

Figure 3:
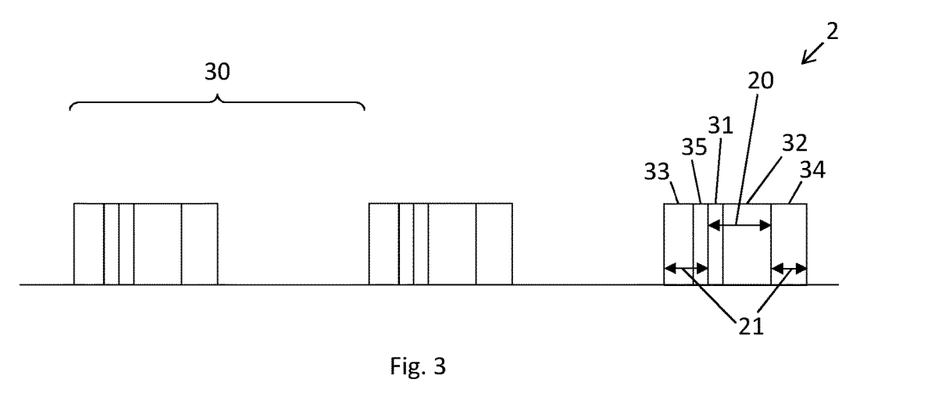
FIG. 3 schematically illustrates a transmitted signal of the data message.

FIG. 3 schematically illustrates an embodiment of a transmitted signal, where the device is arranged for recurrent transmissions of the data message 2 with a first transmission rate 30. Here, the transmission rate is illustrated to be periodic. Periodic transmissions would in many cases be the normal situation, however in general a non-periodic transmission scheme may also be used.

Generally, in a mobile collection scheme the data message 2 must be sent out sufficiently frequent to be available for a drive-by or walk-by collection unit at random times of collection. The period 30 may in embodiments be in the range of seconds up to minutes. In a fixed collection scheme, the data message 2 may be sent out less frequent, e.g. with a period of one hour, a few hours, once a day, once a week, or at other appropriate rate.

Generally, a data message includes a sync word as part of a preamble in order to synchronize a transmission by indicating the end of header information and the start of data.

In an embodiment a single (first) sync word 31 is used. The first sync word 31 may be grouped together with the payload 32 of the data message. In this manner the first sync word 31 and the payload 32, possibly together with other data fields, may provide a coherent data message in the form of the sub data message 20.

The first sync word may generally also be used for syncing the receiver to the entire data message 2. However, it may be beneficial to include a second stronger sync word 33 in the data message. In this manner, a long range receiver may listen for the second sync word, whereas the short range receiver listens for the first sync word. A stronger sync word may be needed in order to receive the data message at a larger distance than is possible with the first sync word which may be defined in accordance with a given communication protocol.

The data message 2 illustrated in FIG. 3 further comprises the error correcting information 34 and an information block 35 used for transmitting general data message information. The second part 21 of the data message is in this embodiment made up of the data blocks 33, 34 and 35.

Thus the data message 2 comprises a data block forming a second sync word 33, a data block forming a first sync word 31, a data block forming an information header 35, a data block forming a payload 32 and a data block comprising error correcting information 34. In general, further and other data blocks may be used in the data message, as well as the order of the blocks may be different than illustrated in FIG. 3.

Figure 4:
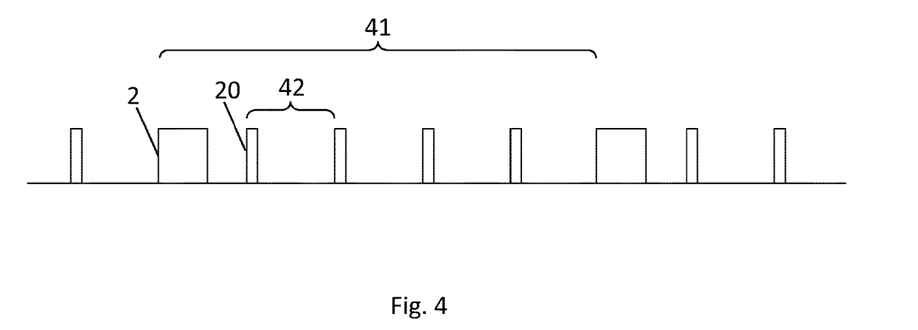
FIG. 4 illustrates a transmitted signal which comprises the data message and further data messages.

FIG. 4 illustrates an embodiment wherein the device is further arranged for transmission of a further data message, the further data message being the sub data message 20 per se. In this embodiment, the data message 2 is recurrently transmitted with a first transmission rate 41 and the further data message 20 is recurrently transmitted with a second transmission rate 42. In an embodiment, either the data message 2 or the further data message 20 is transmitted with a given transmission frequency, where each N'th further data message is replaced by the data message 2 in accordance with embodiments of the present invention.

Such an embodiment may be used in a general collection scheme where the short-range sub message 20 is transmitted with a relative high frequency to enable mobile data collection by drive-by or walk-by, and where the data message 2 is transmitted as a less frequent long-range back-up transmission to a fixed collector. By a relative low transmission frequency of the long-range data message, a longer battery life-time can be ensured both for a battery operated transmitter, as well as for a battery operated receiver of the long range data message.

In an embodiment, two data messages with different error-correcting information, however, having similar payload, may recurrently be transmitted. In this embodiment, a first data message is constructed so that its second part comprises first error-correcting information, and a second data message is constructed where the second part comprises second error-correcting information. The transmitting device is arranged for recurrent transmissions of the first data message with a first transmission rate, and for recurrent transmissions of the second data message with a second transmission rate. In such an embodiment, a data signal may be tailored to two different types of long range receivers. Such a signal may even further comprise a further data message in the form of the sub data message. Such a general signal may be used in a very flexible collection scheme. An example of use of such a signal is a system where the further data message is received by a household display device, for providing updated live consumption information to the user, whereas the first data message is tailored for mobile collection by a service vehicle and the second data message is tailored for backup collection of a fixed collector network. In such an embodiment, the first data message may be constructed with less robust error correction information than the second data message, and thus requires less power to construct, transmit and decode, than does the second data message.

In various embodiments, the properties of the data message and the further data message, i.e. the sub data message, may be varied in accordance with a given desired implementation.

Depending on a desired implementation, the data message and the further data message are transmitted with the same signal strength or with different signal strengths. It may for example be desired to diminish the signal strength of the data message compared to the further data message to reduce the power consumption for the transmission. The error correction ability may provide a sufficiently long transmission range with a lower transmission strength compared to the further data message.

In other examples, the data message and the further data message are transmitted at the same centre frequency or at different centre frequencies, with the same signal bandwidth or with different signal bandwidths, at the same data rate or at different data rates, in accordance with a desired transmission scheme.

In an embodiment, also the payload may be selected so that the data message and the further data message are transmitted with the same payload or with different payloads. If the data message is implemented as a backup transmission, the payload may be tailored in accordance with desired information of the backup, whereas if short range collection is used in one part of a collection area, and long range collection is used in another part of the collection area, it is normally desired to use the same payload in the two messages.

In an important embodiment, the data message is implemented as a systematic code. A systematic code allows the input data to be a direct part of the encoded error correcting message. To obtain a systematic encoded message, turbo coding or low-density parity-check (LDPC) coding may be used to generate a data message which supports error correction in accordance with embodiments of the present invention.

For systematic codes the error correcting information can be appended to the source block so that the sub data message can be extracted separately from the entire data message with the error correction information.

In an embodiment, the receiver does not need to recover the original sub data message if this is received correctly. To obtain this, the data message further comprises a hash function, such as a cyclic redundancy checksum (CRC) for determining the correctness of the received sub data message.

Figure 5:
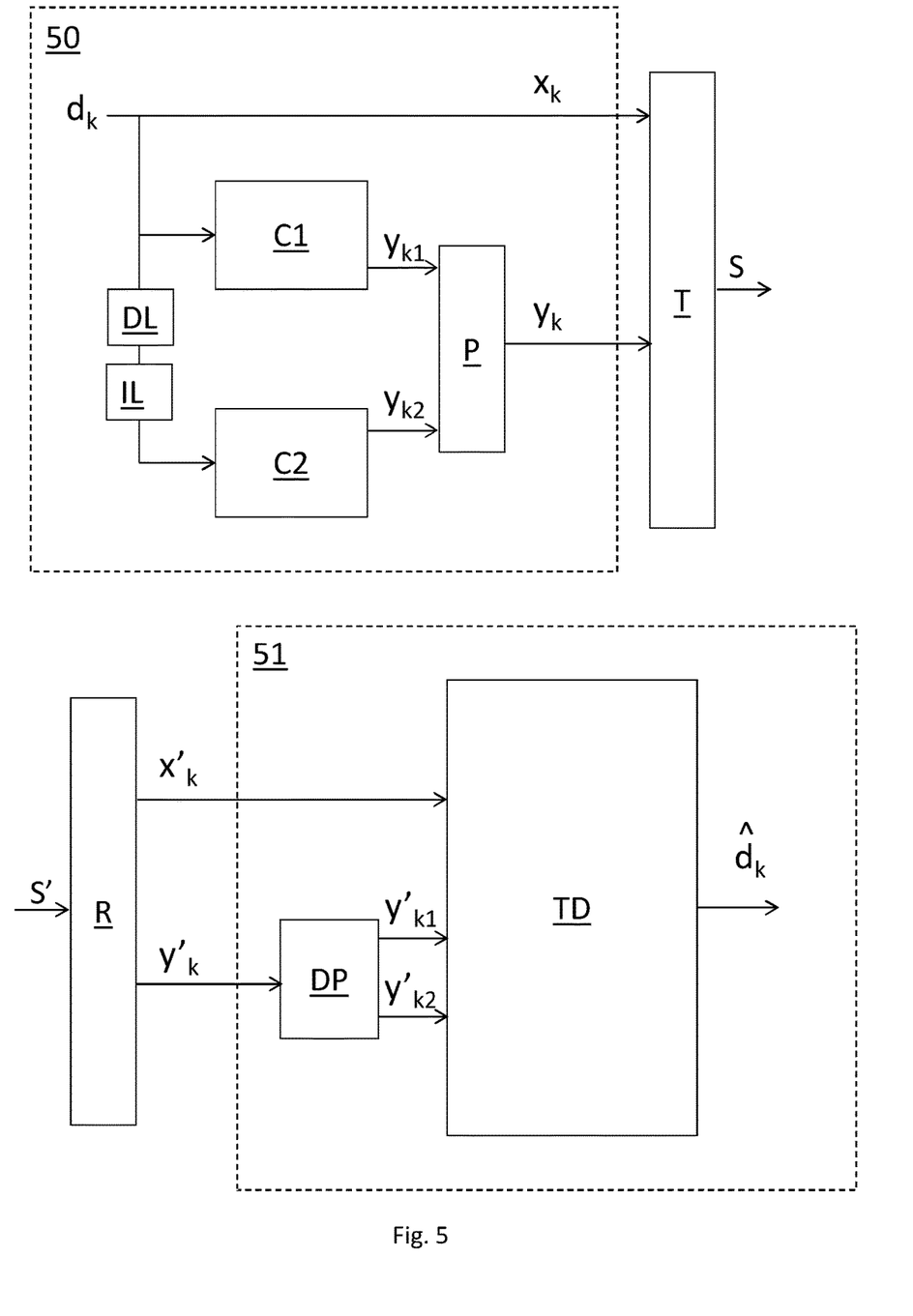
FIG. 5 schematically illustrates an encoder for encoding the sub data message and a decoder for decoding the received data message.

FIG. 5 schematically illustrates elements of an encoder 50 for encoding the sub data message and elements of a decoder 51 for decoding the received data message to obtain an error corrected data message. The encoder 50 may be implemented by the communication unit of the consumption meter, e.g. by the general communication circuitry of the consumption meter, or by a communication unit attached to the consumption meter for providing communication functionality to the consumption meter.

In an embodiment, the sub data message for reporting the utility consumption of a user to the utility owner is generated by the computing unit of the consumption meter. The sub data message, or parts of sub data message, is put into the encoder as input data, $d_k$. The encoder may be implemented by the general computation circuitry in any appropriate way supported by the specific consumption meter.

In the illustrated implementation of the turbo encoder a rate ⅓ encoder is shown. Three sub-blocks of bits are constructed. The first sub-block is a block of data in the form of the input data message $x_k$. The second sub-block is n/2 parity bits, $y_{k1}$, for the input data, computed using a recursive systematic convolutional code (RSC code) by the computing unit $C_1$. The third sub-block is n/2 parity bits, $y_{k2}$, for a known permutation of the input data, again computed using an RSC convolutional code by the computing unit $C_2$. Thus, two redundant but different sub-blocks of parity bits are sent with the input data. The permutation of the payload data is carried out by use of an interleaver, IL, and a delay line, DL.

The turbo code encoder consists of two identical RSC coders, $C_1$ and $C_2$, which each output a series of parity bits ($y_{k1}$ and $y_{k2}$), these are arranged in relation to each other in a parallel concatenation scheme by a so-called puncturer P to generate a combined block of parity bits, $y_k$, to form the error correcting information. The functioning of the puncturer is in a systematic way to drop some of the input parity bits $y_{k1}$ and $y_{k2}$ to obtain an output rate from P which is lower than the total input rate. The input data $x_k$ and the error correcting information $y_k$ are input into a computing unit T of the consumption meter, to be arranged in accordance with the format or protocol used for the data message, and transmitted as a signal S forming the data message.

The transmitted signal S with the data message is received as a received signal S' by a receiver R of the collector.

The collector comprises, or is connected to, a decoder 51 for decoding the received data message. The decoder generally requires somewhat more computing power than the encoder, since it is generally a considerably more demanding computational task to decode or reconstruct the received signal than to encode the signal.

The received signal is split into the input data $x'_k$ and the parity data $y'_k$. The parity data is input into a depuncturer DP to obtain the two series of parity bits $y'_{k1}$ and $y'_{k2}$. The depuncturer follows the inverse strategy of the puncturer, so that in the cases where the puncturer dropped a parity bit, the depuncturer inserts a special unknown parity bit so that the turbo decoder, TD, takes into account that the given parity bit was never transmitted in S. The three blocks of data are put into the turbo decoding unit TD to compute a best estimate of the input data $\hat{d}_k$.

FIG. 5 illustrates turbo encoder 50 and turbo decoder 51 in general form which may used in connection with an embodiment of the present invention. There are many different instances of turbo codes, using different component encoders/decoders, input/output ratios, interleavers, and puncturing patterns. It is within the capabilities of the person skilled in communication signal engineering to design an appropriate encoding/decoding scheme.

Returning to FIG. 1, the figure illustrates an embodiment of a system for communication of data messages relating to consumption data of a supplied utility. The system comprises a transmitter device in the form of the consumption meter 1, a first data receiver in the form of the mobile collector 3, and a second data receiver in the form of the fixed collector 4. In a general system a number of consumption meters is distributed over an area, a single mobile collector may be used and moved along a collection route, and a number of fixed collectors may be placed strategically to collect backup transmissions from all meters in the collection area.

The consumption meters may transmit data messages as illustrated in FIG. 3 where only a single type of data message is transmitted, data messages as illustrated in FIG. 4, where two types of data messages are transmitted, as well as more complicated data signals with a number of different data message types. The system is discussed with signals as illustrated in FIG. 3 and FIG. 4, but it is within the capabilities of the skilled person to expand the system to also encompass other signal types within the scope of the present invention.

In connection with a signal of the type illustrated in FIG. 3, the first receiver 3 may be a handheld collector, possibly a specially programmed smart phone system, capable of collecting a data message encoded in accordance with the wireless MBus communication protocol.

The first receiver may listen for a sync word defined by the communication protocol, and once receiving such sync word, will collect the wireless MBus part of the data message, i.e. the first part 20 of the transmitted data message. Such data collectors are known in the art. The mobile collector will not be affected by the second part of the data message.

The second receiver 4 is placed at a distance which is outside the expected communication range of data messages transmitted by the wireless MBus protocol, and even if it is capable to detect the first sync word, the signal will normally be too noisy to be received correctly.

In an embodiment, the second receiver listens for a second stronger sync word, and upon receiving such sync word collects the entire data message. The entire data message will then either be transmitted to the utility or the first part of the signal will be reconstructed by the second collector, and this reconstructed first part is transmitted to the utility.

In an embodiment where the signal transmitted by the consumption meter is as illustrated in FIG. 4, the system will operate in a practically similar manner in terms of data collection. The mobile collector will not see a difference between the entire data message 2 and the further data messages in the form of the first part 20 of the entire data message. The mobile collector will merely see a periodic recurring MBus data message of the same type.

The fixed collector, on the other hand will not see the further data message 20, but only the entire data messages 2, which will be received as periodic recurring data messages.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A device for transmitting data messages relating to consumption data of a supplied utility, the device being arranged as a communication unit of a consumption meter, wherein the device is arranged for encoding and transmitting a data message comprising:
   a first part which comprises a payload and is encoded in accordance with a communication protocol; and
   a second part which comprises error-correcting information for enabling a receiver device to correct errors in the data message,
   wherein the first part forms an independent sub data message which can be received independently of the second part by a receiver device, the sub data message being receivable by a receiver within a first communication range, and
   wherein the data message is receivable by a receiver within a second communication range, the second communication range being longer than the first communication range such that the first part and the second part are receivable by the receiver within the second communication range by way of the error-correcting information of the second part.

2. The device according to claim 1, wherein the device is arranged for recurrent transmissions of the data message with a first transmission rate.

3. The device according to claim 1, wherein the first part further comprises a first sync word.

4. The device according to claim 1, wherein the first part further comprises a first sync word and wherein the second part further comprises a second sync word.

5. The device according to claim 1, wherein the error-correcting information comprises turbo code parity information or low-density parity-check (LDPC) code blocks.

6. The device according to claim 1, wherein the data message comprises a data block forming a second sync word, a data block forming a first sync word, a data block forming an information header, a data block forming a payload and a data block comprising error correcting information.

7. The device according to claim 1, wherein the data message further comprises a hash function of the first part of the data message.

8. The device according to claim 1, wherein the second part comprises error-correcting information for enabling a receiver device to correct errors in at least the payload of the sub data message.

9. The device according to claim 1, wherein the device is arranged for encoding and transmitting a first data message where the second part comprises first error-correcting information, and further arranged for encoding and transmitting a second data message where the second part comprises second error-correcting information, and wherein the device is arranged for recurrent transmissions of the first data message with a first transmission rate, and wherein the device is arranged for recurrent transmissions of the second data message with a second transmission rate.

10. The device according to claim 1, wherein the device is further arranged for transmission of a further data message, the further data message being a transmission of the sub data message.

11. The device according to claim 10, wherein the device is arranged for recurrent transmissions of the data message with a first transmission rate and for recurrent transmissions of the further data message with a further transmission rate.

12. The device according to claim 10 wherein the data message and the further data message are transmitted with the same signal strength or with different signal strength.

13. The device according to claim 10 wherein the data message and the further data message are transmitted at the same centre frequency or at different centre frequencies.

14. The device according to claim 10 wherein the data message and the further data message are transmitted with the same signal bandwidth or with different signal bandwidths.

15. The device according to claim 10 wherein the data message and the further data message are transmitted at the same data rate or at different data rates.

16. The device according to claim 10 wherein the data message and the further data message are transmitted with the same payload or with different payloads.

17. A system for communication of data messages relating to consumption data of a supplied utility, the system comprises the device for transmitting data messages according to claim 1, and a first data receiver and at least a second data receiver, wherein the first data receiver is arranged for receiving the sub data message, and wherein the second data receiver is arranged for receiving the data message.

* * * * *